(12) United States Patent
Hatano et al.

(10) Patent No.: US 6,791,755 B2
(45) Date of Patent: Sep. 14, 2004

(54) OPTICAL DEVICE FOR MAKING LIGHT CONVERGE

(75) Inventors: Hiroshi Hatano, Takatsuki (JP); Kyu Takada, Otsu (JP)

(73) Assignee: Minolta Co., Ltd., Osaka (JP)

( * ) Notice: Subject to any disclaimer, the term of this patent is extended or adjusted under 35 U.S.C. 154(b) by 46 days.

(21) Appl. No.: 10/212,238

(22) Filed: Aug. 6, 2002

(65) Prior Publication Data

US 2003/0039034 A1 Feb. 27, 2003

(30) Foreign Application Priority Data

Aug. 8, 2001 (JP) ........................................ 2001-241124

(51) Int. Cl.[7] .......................... G02B 27/44; G11B 7/12
(52) U.S. Cl. .................. 359/565; 359/572; 369/112.04; 369/44.24
(58) Field of Search ................... 369/112.04, 44.24, 369/19, 565, 569, 572

(56) References Cited

U.S. PATENT DOCUMENTS

| | | | | | |
|---|---|---|---|---|---|
| 4,866,694 A | * | 9/1989 | Korth | ...................... | 369/44.12 |
| 5,068,751 A | * | 11/1991 | Braat et al. | .................. | 359/566 |
| 5,946,281 A | * | 8/1999 | Ito et al. | ................. | 369/112.07 |
| 6,130,779 A | * | 10/2000 | Carlson et al. | ............. | 359/566 |
| 6,307,832 B1 | * | 10/2001 | Novotny et al. | ............ | 369/300 |
| 6,359,852 B1 | * | 3/2002 | Ueyanagi | ..................... | 369/118 |
| 6,396,789 B1 | * | 5/2002 | Guerra et al. | .......... | 369/112.01 |
| 6,700,856 B2 | * | 3/2004 | Ueyanagi | ............... | 369/112.23 |
| 6,704,250 B1 | * | 3/2004 | Ueyanagi | ................. | 369/13.33 |
| 2002/0126394 A1 | * | 9/2002 | Kim | ........................... | 359/719 |

FOREIGN PATENT DOCUMENTS

| | | |
|---|---|---|
| JP | 10-92002 | 4/1998 |
| JP | 11-45455 | 2/1999 |
| JP | 2000-162503 | 6/2000 |

* cited by examiner

*Primary Examiner*—John Juba, Jr.
(74) *Attorney, Agent, or Firm*—McDermott Will & Emery LLP (57) ABSTRACT

An optical device for making light converge produces a convergent light beam with a satisfactorily great numerical aperture and acceptably small aberrations. The optical device has a plurality of diffraction gratings that each make light converge. The light shone into the optical device is passed through one after another of those diffraction gratings in such a way that the light is made to converge to a higher degree every time it passes through one of the diffraction gratings. The diffraction gratings may be all transmissive, all reflective, or a combination of both. The diffraction gratings are formed on a surface of or at an interface inside the optical device, and two diffraction gratings may be formed on a single surface. The light is made to eventually converge on the exit surface of the optical device so that the optical device functions as a solid immersion device.

21 Claims, 6 Drawing Sheets

OPTICAL DEVICE FOR MAKING LIGHT CONVERGE

This application is based on Japanese Patent Application No. 2001-241124 filed on Aug. 8, 2001, the contents of which are hereby incorporated by reference.

BACKGROUND OF THE INVENTION

1. Field of the Invention

The present invention relates to an optical device for making light converge, and particularly to an optical device for producing a convergent light beam with a great numerical aperture for use in, for example, an optical system of a microscope or optical recording apparatus.

2. Description of the Prior Art

In an optical microscope that permits the observation of a test sample by the use of light, or an optical recording apparatus that permits the recording, reproducing, and erasing of information by the use of light, to achieve a high resolution or high recording density, it is essential to make light converge in a minute area on a test sample or recording medium. The size of the spot formed by a convergent light beam is inversely proportional to the numerical aperture (NA) of the light beam, and therefore, the greater the NA of a light beam is made, the smaller its spot diameter can be made.

The NA of a convergent light beam is given by equation (1) below, where n represents the refractive index through which the convergent light beam passes and $\theta_{max}$ represents the maximum angle that the convergent light beam makes with its own optical axis (i.e., the angle between the outermost ray and the optical axis of the convergent light beam).

$$NA = n \cdot \sin(\theta_{max}) \tag{1}$$

Accordingly, effective ways to reduce the diameter of the spot formed by a convergent light beam is to increase the maximum angle $\theta_{max}$ and to increase the refractive index n of the medium in addition. Immersion techniques used in microscopes depend on the latter, and achieve a greater NA by filling the space between an objective lens and a test sample with a liquid having a high refractive index. An immersion technique using oil as a high-refractive-index liquid is called oil immersion, one using water is called water immersion, and one using a solid instead of a liquid is called solid immersion.

Figure 15:
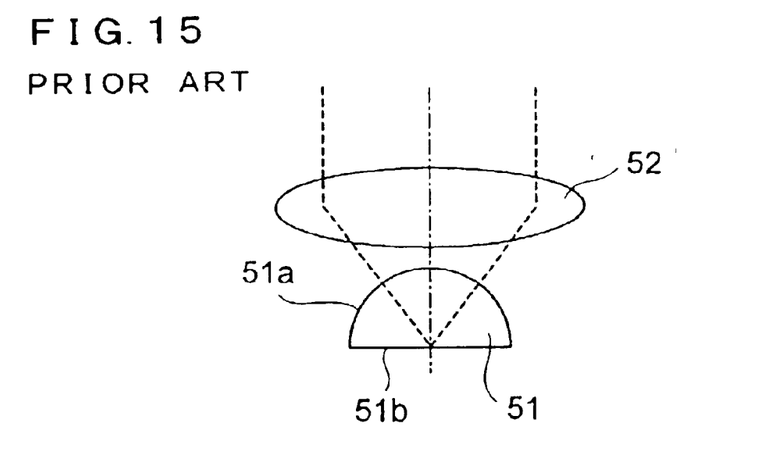
FIG. 15 is a vertical sectional view schematically showing the structure of a conventional solid immersion lens used in combination with an objective lens.

Optical devices exploiting solid immersion are best exemplified by solid immersion lenses (SILs) and solid immersion mirrors (SIMs). A SIL is generally used in combination with another objective lens. FIG. 15 shows such a structure. The SIL 51 is hemispherical, and a convergent light beam emanating from an objective lens 52 enters the SIL 51 through a spherical surface 51a thereof and exits the SIL 51 through a flat surface 51b thereof. The SIL 51 and the objective lens 52 are so arranged that all the rays of the convergent light beam from the objective lens 52 are incident substantially perpendicularly on the spherical surface 51a. Thus, the light enters the SIL 51 without being refracted by the spherical surface 51a, and converges on the flat surface 51b. In this way, the SIL 51, although a lens, is used in such a way as not to exert any power that makes light converge.

A SIM is produced by forming a convex reflective surface on a surface of a base material, and on this reflective surface, which is a concave surface when seen from inside, light is shone from inside so as to be made to converge by reflection. Thus, the SIM, although a single device, has the functions of both the SIL 51 and the objective lens 52 described above. In addition, the SIM does not produce aberrations as are inevitable when light is made to converge by refraction, and thus more readily permits light to converge at one point on the optical axis. However, simply forming a convex reflective surface on a surface of a base material results in a reflective device, i.e., a device on which light is shone from the same direction in which the light is reflected by the device. This makes effective use of solid immersion difficult, and imposes severe constraints on the use of such a device.

Figure 16:
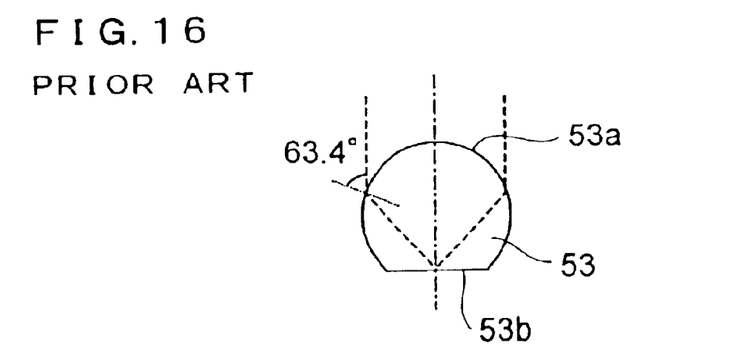
FIG. 16 is a vertical sectional view schematically showing the structure of another conventional solid immersion lens.

A SIL that is used in such a way as to make light converge has also been proposed (Japanese Patent Application Laid-Open No. H11-45455). FIG. 16 shows this structure. Light enters the SIL 53 through an aspherical surface 53a thereof and exits the SIL 53 through a flat surface 53b thereof. The thickness of the SIL 53 (its dimension in the direction perpendicular to the flat surface 53b) is made equal to its focal length as a lens. Thus, the SIL 53 refracts a parallel light beam with the entrance surface 53a and thereby converges the light beam onto the flat surface 53b.

This SIL 53 configured as described above is easy to use, because it does not need to be combined with another objective lens, nor does it require alignment of optical axes or adjustment of a distance. However, with this SIL 53, it is impossible to obtain a convergent light beam with a NA greater than a certain limit. For example, to form a parallel light beam into a convergent light beam with a NA of 1, if the base material is assumed to have a refractive index of 1.8, the angle of incidence of the outermost ray with respect to the entrance surface 53a needs to be 63.4°. This makes the fabrication of the SIL 53 very difficult.

Figure 17:
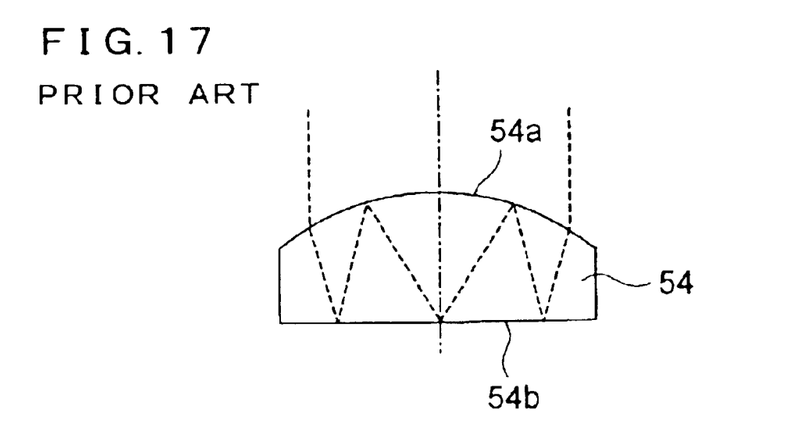
FIG. 17 is a vertical sectional view schematically showing the structure of a conventional optical device having the functions of both a solid immersion lens and a solid immersion mirror.

With the advantages and disadvantages of both SILs and SIMs in mind, the inventors of the present invention have proposed a solid immersion device that makes light converge by both refraction and reflection (Japanese Patent Application Laid-Open No. 2000-162503). FIG. 17 shows this structure. This optical device 54, like a SIM, has a convex surface formed on a surface of a base material, but a reflective surface is formed only in a central portion of this convex surface 54a, with a peripheral portion thereof left as a transmissive surface. The surface of the base material opposite to the convex surface 54a is formed into a flat surface 54b. Light enters the optical device 54 through the peripheral portion of the convex surface 54a, and is thereby formed into a convergent light beam by refraction. The light is then reflected on the flat surface 54b so as to be directed to the central portion of the convex surface 54a, where the light is reflected again and is thereby formed into a more convergent light beam. Thus, the light is eventually made to converge on the flat surface 54b so as to exit the optical device 54 through the flat surface 54b.

This optical device 54, although a transmissive device like a SIL, i.e., a device on which light is shone from the direction opposite to the direction in which the light exits the device, produces a convergent light beam with a great NA without an undue increase in the angles of incidence of rays with respect to the convex surface 54a. Moreover, this optical device 54 can be made thinner than a comparable SIL.

An optical device that makes light converge by diffraction has also been proposed (Japanese Patent Application Laid-Open No. H10-92002). This optical device has a diffraction grating formed on one surface of a base material shaped like a flat plate. Light enters the optical device through this diffraction grating, and is thereby formed into a convergent light beam, which exits the optical device through the opposite surface thereof.

An optical device that makes light converge by diffraction can be formed as a solid immersion device by giving it an appropriate thickness.

Figure 18:
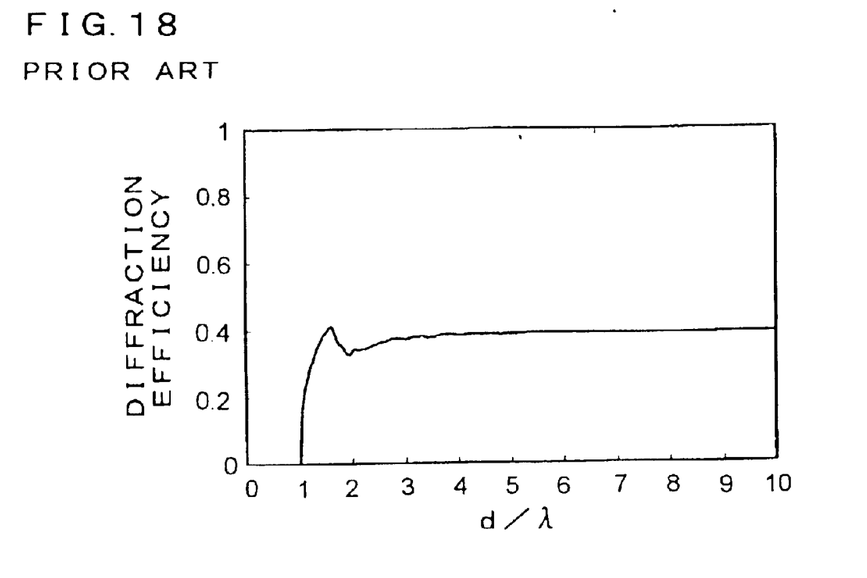
FIG. 18 is a diagram schematically showing an example of the relationship between the ratio of the pitch of a diffraction grating to the wavelength of light and diffraction efficiency.

However, even when an optical device that makes light converge by diffraction is formed as a solid immersion device, it is still impossible to obtain a convergent light beam with a NA greater than a certain limit. To obtain a large angle of diffraction, the pitch of the diffraction grating needs to be reduced. However, reducing the pitch of the diffraction grating too much causes a phenomenon called anomaly, which extremely lowers diffraction efficiency. FIG. 18 shows an example of the relationship between the ratio of the pitch d of a diffraction grating to the wavelength $\lambda$ of light and diffraction efficiency. Diffraction efficiency drops abruptly starting from a d/$\lambda$ of about 1.7 down, which phenomenon is referred to as anomaly. The shape of a diffraction grating determines how high its diffraction efficiency is. However, the range of d/$\lambda$ in which the diffraction efficiency of a diffraction grating remains substantially constant does not depend on the shape of the diffraction grating. That is, irrespective of the shape of a diffraction grating, anomaly occurs at a d/$\lambda$ of about 1.7 or less.

Figure 19A:
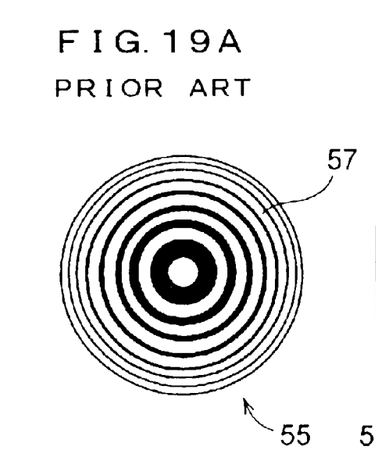
FIG. 19A is a plan view schematically showing the structure of an optical device that makes light converge with a diffraction grating.
Figure 19B:
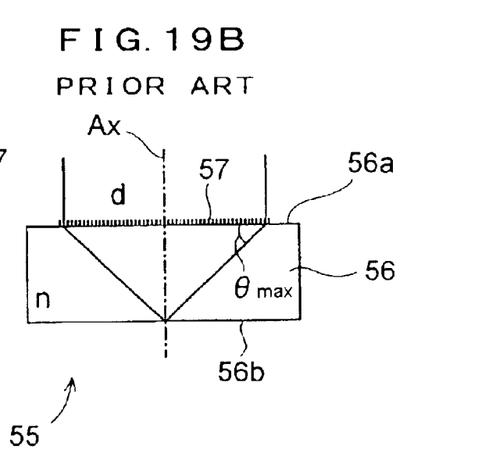
FIG. 19B is a vertical sectional view of the optical device shown in FIG. 19A.

Consider how a convergent light beam with as high a NA as possible can be obtained with a solid immersion device 55 shown in FIGS. 19A and 19B. FIGS. 19A and 19B are a plan view and a sectional view, respectively, of the optical device 55, which is composed of a base plate 56 having a refractive index of n and a diffraction grating 57 formed on a surface 56a thereof. The diffraction grating 57 is formed concentrically, and, to permit light to converge at one point, its pitch d is so set as to decrease away from the center.

Now, suppose that light having a wavelength of $\lambda$ is perpendicularly incident on the diffraction grating 57, and that the outermost ray is diffracted at an angle of diffraction of $f$max. Then, if the pitch of the diffraction grating 57 in a portion thereof where the outermost ray is incident is dext, equation (2) below holds. From equations (1) and (2), equation (3) below is derived.

$$dext \cdot \sin(\theta max) = \lambda/n \quad (2)$$

$$NA = \lambda/dext \quad (3)$$

Here, attempting to make the NA equal to 1 is equivalent to attempting to make the pitch dext equal to the wavelength. However, as shown in FIG. 18, when d/$\lambda$ equals 1, diffraction efficiency is almost zero, and therefore no diffraction occurs in practical terms. That is, with the optical device 55 shown in FIGS. 19A and 19B, it is impossible to obtain a convergent light beam with a NA of 1.

Figure 20:
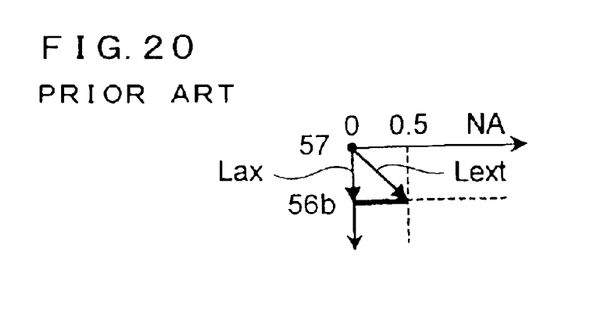
FIG. 20 is a diagram schematically showing an example of how the optical device shown in FIGS. 19A and 19B changes the NA of light.

The lower limit of d/$\lambda$ that yields satisfactorily high diffraction efficiency is about 1.7, and this determines the maximum NA obtained with a single diffraction grating. Equation (3) gives this maximum value of the NA as about 0.59. FIG. 20 schematically shows how the optical device 55 changes the NA. This figure shows a case in which the pitch dext is twice the wavelength $\lambda$, and thus shows that the diffraction by the diffraction grating 57 causes the incident light to reach the opposite surface 56b as a convergent light beam with a NA of 0.5. In the figure, Lax represents the ray along the optical axis Ax, and Lext represents the outermost ray.

As discussed above, conventional optical devices do not readily produce a convergent light beam with a satisfactorily great NA, and thus have been becoming unable to keep up with demand for smaller beam spot diameters.

SUMMARY OF THE INVENTION

An object of the present invention is to provide an optical device that produces a convergent light beam with a great NA.

To achieve the above object, according to the present invention, an optical device for making the light shone into it converge is provided with a plurality of diffracting portions each making the light passing therethrough converge by diffraction, and the light shone into the optical device is passed through one after another of the plurality of diffracting portions so that the light is made to converge to a higher degree every time the light passes through one of the diffracting portions. This optical device makes light converge by diffraction, and achieves this not by diffracting light only once but by doing so a plurality of times on the plurality of diffracting portions so as to make the light converge to increasingly high degrees stepwise. Although there is an upper limit on the NA of a convergent light beam obtained with a single diffraction grating as described above, by making light converge to increasingly higher degrees stepwise, it is possible to obtain a convergent light beam with a NA greater than that upper limit.

Here, the diffracting portions may be of the type that makes light converge by transmitting the light, or of the type that makes light converge by reflecting the light. The diffracting portions may be formed on a surface of the optical device, or at an interface inside the optical device. Irrespective of whether formed on a surface or interface, the diffraction portions may be of the type that diffracts the light transmitted therethrough, or of the type that diffracts the light reflected therefrom. In a case where a diffracting portion is formed on a surface, it is also possible to form this diffracting portion as one that diffracts the light transmitted therethrough so that light is introduced into the optical device by being transmitted through this diffracting portion, that is, to form a diffracting portion on the entrance surface through which light enters the optical device.

It is also possible even to form two or more diffracting portions in different areas on a single surface. Directing light from one to the other of two diffracting portions formed in different areas on a single surface can be achieved easily by providing a reflective surface, for example by the use of another diffracting portion. The single surface may be a surface of the optical device, or an interface inside the optical device. An interface inside the optical device denotes an interface between two media having different optical properties, and, as long as such a surface is continuous and has the same medium throughout on one side, it is regarded as a single surface irrespective of whether flat or curved.

The diffracting portions may be diffraction gratings. By forming the optical device out of two or more base materials having different refractive indices, it is possible to form a diffraction grating inside the optical device.

It is advisable to make the light shone into the optical device converge in such a way that the light has the minimum diameter on the surface through which the light exits the optical device. This permits the optical device to function as a solid immersion device. That is, the convergent light beam with a great NA obtained through the plurality of diffraction portions can be shone directly on a target. In this way, it is possible to obtain an extremely small spot.

It is also possible to provide a light-shielding member on the surface through which the light shone into the optical device exits the optical device, with an opening smaller than the diameter of the light on the surface formed in the light-shielding member, so that the light is made to exit the optical device through the opening. This permits only a central portion of the convergent light beam to be shone on a target. In this way, it is possible to obtain a spot even smaller than that formed by the convergent light beam with an increased NA obtained through the plurality of diffracting portions.

It is also possible to form part of a surface of the optical device into a protruding portion so that the light shone into the optical device is made to exit the optical device through the protruding portion. The optical device, which produces a convergent light beam with a great NA, is used in the immediate vicinity of a target, and therefore may make contact with the target if inclined even slightly. By making only a portion of the surface of the optical device facing the target protrude, it is possible to greatly reduce the risk of such contact.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
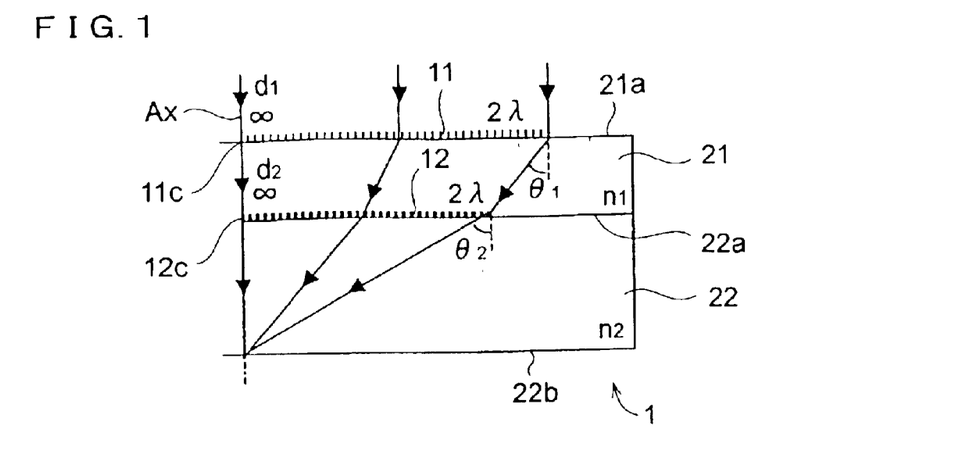
FIG. 1 is a vertical sectional view schematically showing the structure of the optical device of a first embodiment of the invention.

Hereinafter, optical devices embodying the present invention will be described with reference to the drawings. FIG. 1 schematically shows a section of the optical device 1 of a first embodiment of the invention. The optical device 1 is produced by cementing together two transparent base plates 21 and 22 each shaped like a flat plate. A diffraction grating 11 is formed on a surface 21a of the base plate 21, and another diffraction grating 12 is formed on the cementing surface 22a between the base plates 21 and 22. The diffraction gratings 11 and 12, like the one shown in FIG. 19A, have grooves formed concentrically, and the center 11c of the diffraction grating 11 coincides with the center 12c of the diffraction grating 12 in the direction along the surface 21a of the base plate 21. It is to be noted that FIG. 1 shows only substantially a half of the optical device 1.

Light enters the optical device 1 through the diffraction grating 11 formed on the surface 21a of the base plate 21 and exits the optical device 1 through a surface 22b of the base plate 22. Meanwhile, the light is diffracted by the diffraction gratings 11 and 12 and is thereby formed into a convergent light beam that converges on the surface 22b. The pitch d1 of the diffraction grating 11 is so set as to decrease away from the center 11c so that the light transmitted therethrough converges at one point. The pitch d2 of the diffraction grating 12, too, is so set as to decrease away from the center 12c so that the light transmitted therethrough converges at one point. The pitches p1 and p2 of the diffraction gratings 11 and 12 are infinite at their respective centers 11c and 12c, and therefore the diffraction gratings 11 and 12 do not cause diffraction at the centers 11c and 12c. The line connecting the center 11c of the diffraction grating 11 to the center 12c of the diffraction grating 12 is the optical axis Ax of the optical device 1, and the light shone into the optical device 1 converges at the intersection between the optical axis Ax and the surface 22b.

In this way, the diffraction grating 11 makes the introduced light converge, and the diffraction grating 12 makes the light further converge to increase the overall degree of convergence. As a result, the optical device 1 produces a convergent light beam with a great NA. Now, how the diffraction gratings 11 and 12 are designed will be described, taking up as an example a case in which a parallel light beam is formed into a convergent light beam with a NA of 1.

Let the refractive indices of the base plates 21 and 22 be n1 and n2, respectively, the wavelength of light be λ, the angle of any given ray after passing through the diffraction grating 11 relative to the optical axis Ax (the angle of diffraction ascribable to the diffraction grating 11) be θ1, and the angle of the same ray after passing through the diffraction grating 12 relative to the optical axis Ax be θ2. Then, equations (4) and (5) below hold. Rearranging equation (5) by using the relationship given by equation (4) and expressing it in the same form as the right side of equation (1), which defines the NA, gives equation (6) below.

$$n1 \cdot d1 \cdot \sin(f1) = \lambda \quad (4)$$

$$n2 \cdot d2 \cdot \sin(\theta2) - n1 \cdot d2 \cdot \sin(f1) = \lambda \quad (5)$$

$$n2 \cdot \sin(\theta2) = (1/d1 + 1/d2) \cdot \lambda \quad (6)$$

Hence, if the pitches d1 and d2 of the diffraction gratings 11 and 12 in portions thereof where the outermost ray passes are expressed as d1ext and d2ext, respectively, the NA of the convergent light beam that the optical device 1 produces by making a parallel light beam converge is given by equation (7).

$$NA = (1/d1ext + 1/d2ext) \cdot \lambda \quad (7)$$

Figure 2:
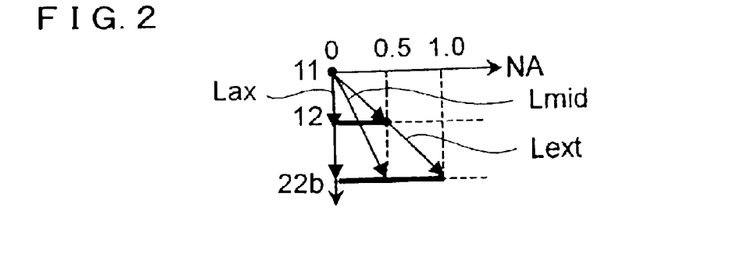
FIG. 2 is a diagram schematically showing an example of how the optical device of the first embodiment changes the NA of light.

For any given value of the NA, there exist an infinite number of combinations of values of d1ext and d2ext that fulfill the relationship expressed by equation (7). For example, one combination that makes NA equal to 1 is d1ext=d2ext=2·λ. FIG. 2 schematically shows how the optical device 1 changes the NA when the pitches p1 and p2 of the diffraction gratings 11 and 12 are set to fulfill this relationship. In FIG. 2, Lax represents the ray along the optical axis Ax, Lext represents the outermost ray, and Lmid represents a ray traveling about midway between the rays Lax and Lext.

Figures 14A, 14B:
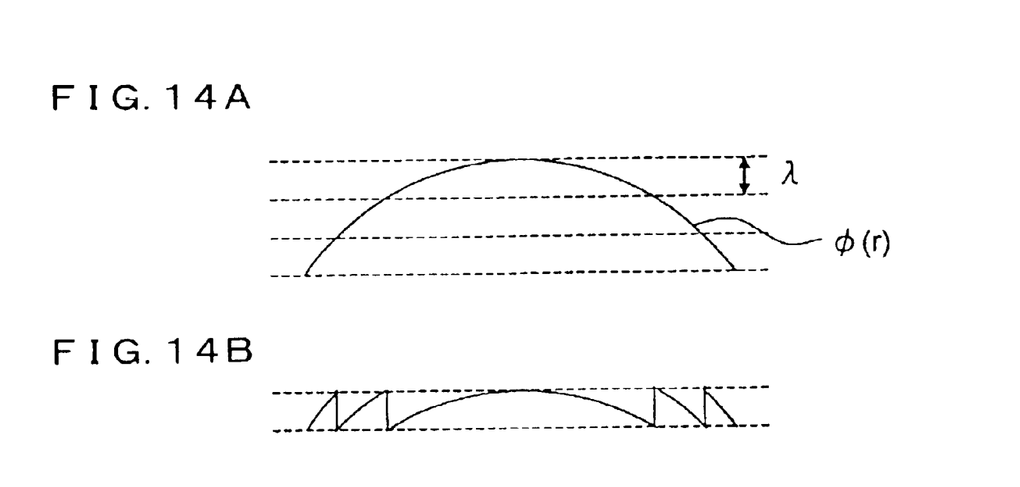
FIG. 14A is a diagram showing an example of an optical path difference function.
FIG. 14B is a vertical sectional view schematically showing the structure of the blazed-type diffraction grating corresponding to the optical path difference function shown in FIG. 14A.
Figure 14C:
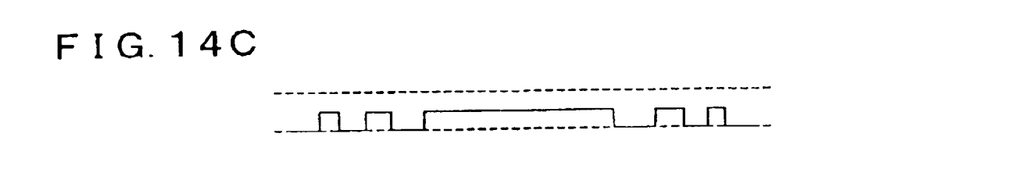
FIG. 14C is a vertical sectional view schematically showing the structure of the binary-type diffraction grating corresponding to the optical path difference function shown in FIG. 14A.

The diffraction gratings 11 and 12 may be of a blazed type, in which an optical path difference function is shifted along the optical axis Ax every length equal to the wavelength λ of light, or may be of a binary type, in which a surface level pattern of a blazed type is approximated with two-level flat surfaces. FIGS. 14A, 14B, and 14C show examples of an optical path difference function φ, a blazed-type diffraction grating, and a binary-type diffraction grating, respectively. The diffraction gratings 11 and 12 may be of a multilevel type in which a surface level pattern of a blazed type is approximated with multiple-level flat surfaces. Diffraction gratings of a binary or multilevel type can be fabricated easily by photolithography.

The optical device 1, which makes light converge on the surface 22b, functions as a solid immersion device. When the optical device 1 is used with the surface 22b kept in the immediate vicinity of a target, a convergent light beam that has come to have a great NA by passing through the diffraction gratings 11 and 12 forms a small spot on the surface 22b, and thus, through the near-field light, an extremely small spot on the target. There exist an infinite number of combinations of the thicknesses of the base plates 21 and 22 that permit light to converge on the surface 22b, and the actual thicknesses of the base plates 21 and 22 are freely chosen from those combinations. The thinner the base plate 21 is made, the smaller the overall thickness of the optical device 1 can be made.

The optical device 1 has only two diffraction gratings. By increasing the number of diffraction gratings, however, it is possible to obtain a convergent light beam with an even greater NA. In the optical device 1, the two base plates 21 and 22 border on each other, and the diffraction grating 12 is formed on the cementing surface 22a between them. It is also possible, however, to interpose an air layer between the base plates 21 and 22 and form the diffraction grating 12 on one of the surfaces that border on the air layer. In this case, the base plates 21 and 22 can be formed out of materials having equal refractive indices. Moreover, the number of diffraction gratings can be increased by forming diffraction gratings on both the surfaces that border on the air layer.

Figure 3:
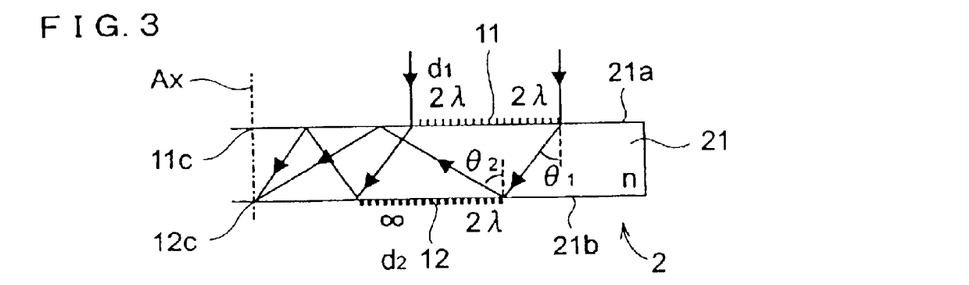
FIG. 3 is a vertical sectional view schematically showing the structure of the optical device of a second embodiment of the invention.

FIG. 3 schematically shows a section of the optical device 2 of a second embodiment of the invention. This optical device 2 has diffraction gratings 11 and 12 formed on opposite surfaces 21a and 21b of a single base plate 21 shaped like a flat plate. The diffraction gratings 11 and 12 are each formed concentrically in a ring-shaped area, and their centers 11c and 12c coincide in the direction along the surface 21a. The line connecting the center 11c of the diffraction grating 11 to the center 12c of the diffraction grating 12 is the optical axis Ax of the optical device 2. The portion of the surface 21a inside the diffraction grating 11, and also the diffraction grating 12 itself, is coated with a reflective coating (not shown) formed out of a metal film or dielectric multilayer film.

Light enters the optical device 2 through the diffraction grating 11, is then reflected from the diffraction grating 12, then from the central portion of the surface 21a, and then exits the optical device 2 through the surface 21b. Meanwhile, the light is diffracted by the diffraction gratings 11 and 12 and is thereby formed into a convergent light beam that converges at the intersection between the optical axis Ax and the surface 21b. The pitch d2 of the diffraction grating 12 is so set as to decrease away from the center 12c so that the light transmitted therethrough converges at one point. On the other hand, the pitch p1 of the diffraction grating 11 is set to be constant, and therefore the diffraction grating 11 offers a uniform angle of diffraction over its entire area. Thus, rays passing at different points in a section of the diffraction grating 11 including the center 11c travel parallel. The diffraction grating 11 makes rays equidistant from the center 11c, i.e. rays traveling at points on a circle about the center 11c, converge at one point on the optical axis Ax, and makes rays traveling at points on another circle about the center 11c converge at a different point on the optical axis Ax.

In this way, the diffraction grating 11 makes the introduced light converge, and the diffraction grating 12 makes the light further converge to increase the overall degree of convergence. As a result, the optical device 2, too, produces a convergent light beam with a great NA. Now, how the diffraction gratings 11 and 12 are designed will be described, taking up as an example a case in which a parallel light beam is formed into a convergent light beam with a NA of 1.

Let the refractive index of the base plate 21 be n. Then, like equations (4) to (6), equations (4') to (6') below hold. Hence, the NA of the convergent light beam produced by the optical device 2 is given by equation (7') below. In these equations, λ represents the wavelength of light, θ1 represents the angle of any given ray after passing through the diffraction grating 11 relative to the optical axis Ax, θ2 represents the angle of the same ray after being reflected from the diffraction grating 12 relative to the optical axis Ax, and d2ext represents the pitch of the diffraction grating 12 in a portion thereof where the outermost ray is reflected.

$$n \cdot d1 \cdot \sin(\theta1) = \lambda \quad (4')$$

$$n \cdot d2 \cdot \sin(\theta2) - n \cdot d2 \cdot \sin(\theta1) = \lambda \quad (5')$$

$$n \cdot \sin(\theta 2) = (1/d1 + 1/d2) \cdot \lambda \qquad (6')$$

$$NA = (1/d1 + 1/d2ext) \cdot \lambda \qquad (7')$$

Figure 4:
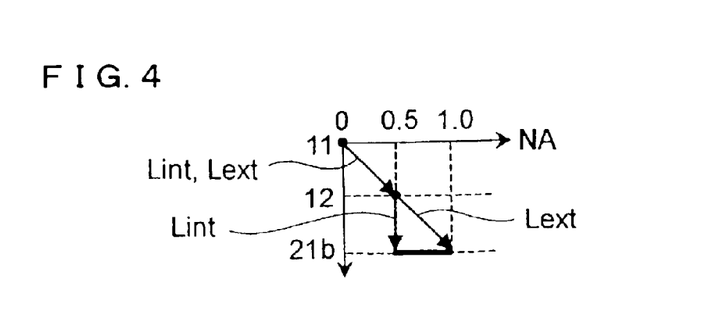
FIG. 4 is a diagram schematically showing an example of how the optical device of the second, a third, and a fourth embodiment change the NA of light.

For any given value of the NA, there exist an infinite number of combinations of values of d1 and d2ext that fulfill the relationship expressed by equation (7'). For example, one combination that makes NA equal to 1 is $d1 = d2ext = 2 \cdot \lambda$. The pitch d2int of the diffraction grating 12 in a portion thereof where the innermost ray is reflected is determined according to the width of the diffraction grating 11, and may be, for example, infinite. FIG. 4 schematically shows how the optical device 2 changes the NA when the pitches p1 and p2 of the diffraction gratings 11 and 12 are set to fulfill this relationship.

In the optical device 2, diffraction gratings 11 and 12 are formed only on surfaces of the base plate 21, and therefore there is no need to lay base plates on each other. This permits the optical device 2 to be fabricated efficiently in a small number of steps.

Table 1 shows a practical example of the design of the optical device 2. It is to be noted that the symbol r in the optical path difference function $\phi(r)$ represents the distance (mm) from the optical axis Ax.

TABLE 1

Material of Base Plate 21: Quartz
Refractive Index n of Base Plate 21: 1.46959 ($\lambda$ = 405 nm)
Thickness of Base Plate 21: 1 mm
NA: 1.0
Outer Diameter of Diffraction Grating 11: 4.438 mm
Inner Diameter of Diffraction Grating 12: 1.857 mm
Optical Path Difference Function of Diffraction Gratings 11 and 12 $\phi(r)$:
$\phi(r) = C2 \cdot r^2 + C4 \cdot r^4 + C6 \cdot r^6 + C8 \cdot r^8 + C10 \cdot r^{10} + C12 \cdot r^{12} + C14 \cdot r^{14}$
Coefficients of Optical Path Difference Function $\phi(r)$:

|  | Diffraction Grating 11 | Diffraction Grating 12 |
| --- | --- | --- |
| C2 | $-2.83292 \times 10^{-1}$ | $9.36203 \times 10^{-2}$ |
| C4 | $1.91608 \times 10^{-2}$ | $-8.22688 \times 10^{-2}$ |
| C6 | $-1.10290 \times 10^{-3}$ | $2.12807 \times 10^{-2}$ |
| C8 | $2.43976 \times 10^{-4}$ | $-3.98306 \times 10^{-3}$ |
| C10 | $-4.20565 \times 10^{-5}$ | $3.60568 \times 10^{-4}$ |
| C12 | $3.78928 \times 10^{-6}$ | $-5.33732 \times 10^{-7}$ |
| C14 | $3.45651 \times 10^{-8}$ | $-1.70245 \times 10^{-6}$ |

Figure 5:
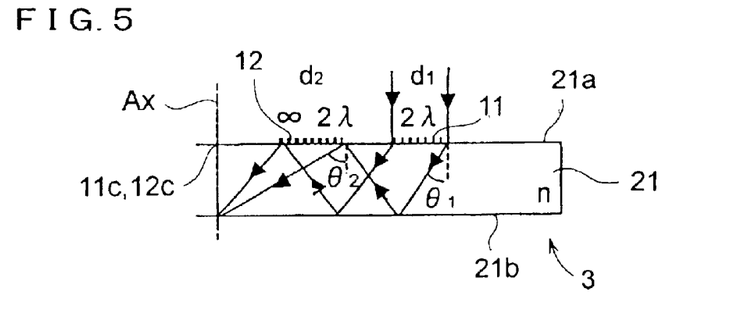
FIG. 5 is a vertical sectional view schematically showing the structure of the optical device of a third embodiment of the invention.

FIG. 5 schematically shows a section of the optical device 3 of a third embodiment of the invention. This optical device 3 is a modified version of the optical device 2 of the second embodiment, in which the diffraction gratings 11 and 12 are formed in different areas on the same surface 21a of the base plate 21. The centers 11c and 12c of the diffraction gratings 11 and 12 coincide. Light enters the optical device 3 through the diffraction grating 11, is then reflected from the surface 21b, then from the diffraction grating 12, and then exits the optical device 3 through the surface 21b. Meanwhile, the light is diffracted by the diffraction gratings 11 and 12 and is thereby formed into a convergent light beam that converges at the intersection between the optical axis Ax and the surface 21b. Here, how the light is made to converge to increasingly high degrees stepwise and the design of the diffraction gratings 11 and 12 are the same as in the optical device 2, and how the optical device 3 changes the NA is the same as shown in FIG. 4.

In the optical device 3, the diffraction gratings 11 and 12 are formed on the same surface 21a, and thus can be formed in a single step. This makes it possible to accurately align the positions of the diffraction gratings 11 and 12 relative to each other. The diffraction gratings 11 and 12 may be protected by providing another base plate on the surface 21a side of the base plate 21. In this case, the diffraction gratings 11 and 12 are located on the same interface inside the base plates.

Tables 2 and 3 show two practical examples of the design of the optical device 3. Here, the optical path difference function $\phi(r)$ is the same as in Table 1.

TABLE 2

Material of Base Plate 21: Quartz
Refractive Index n of Base Plate 21: 1.46959 ($\lambda$ = 405 nm)
Thickness of Base Plate 21: 1 mm
NA: 1.0
Outer Diameter of Diffraction Grating 11: 3.304 mm
Inner Diameter of Diffraction Grating 12: 1.857 mm
Coefficients of Optical Path Difference Function $\phi(r)$:

|  | Diffraction Grating 11 | Diffraction Grating 12 |
| --- | --- | --- |
| C2 | $-2.15236 \times 10^{-1}$ | $-2.10512 \times 10^{-1}$ |
| C4 | $9.55577 \times 10^{-3}$ | $-9.50070 \times 10^{-2}$ |
| C6 | $9.33844 \times 10^{-4}$ | $9.31409 \times 10^{-2}$ |
| C8 | $-3.17766 \times 10^{-4}$ | $-5.54719 \times 10^{-2}$ |
| C10 | $6.02636 \times 10^{-5}$ | $1.43462 \times 10^{-2}$ |
| C12 | 0 | 0 |
| C14 | 0 | 0 |

TABLE 3

Material of Base Plate 21: Quartz
Refractive Index n of Base Plate 21: 1.46959 ($\lambda$ = 405 nm)
Thickness of Base Plate 21: 1 mm
NA: 1.0
Outer Diameter of Diffraction Grating 11: 3.304 mm
Inner Diameter of Diffraction Grating 12: 1.857 mm
Coefficients of Optical Path Difference Function $\phi(r)$:

|  | Diffraction Grating 11 | Diffraction Grating 12 |
| --- | --- | --- |
| C2 | $-1.83466 \times 10^{-1}$ | $-3.66902 \times 10^{-1}$ |
| C4 | $7.08891 \times 10^{-3}$ | $8.64872 \times 10^{-2}$ |
| C6 | $-3.44520 \times 10^{-4}$ | $-3.04564 \times 10^{-2}$ |
| C8 | $1.41892 \times 10^{-5}$ | $6.42115 \times 10^{-3}$ |
| C10 | 0 | 0 |
| C12 | 0 | 0 |
| C14 | 0 | 0 |

Whereas the example of the design shown in Table 2 gives priority to angle-of-view characteristics, the example of the design shown in Table 3 gives priority to decentering characteristics. The wave front aberration (RMS) observed at an angle of view of 0.5° is 14 m$\lambda$ in the design shown in Table 2 and 730 m$\lambda$ in the design shown in Table 3. On the other hand, the wave front aberration (RMS) observed when the diffraction gratings 11 and 12 are decentered by 0.02 mm from each other is 1,212 m$\lambda$ in the design shown in Table 2 and 19 m$\lambda$ in the design shown in Table 3.

Figure 6:
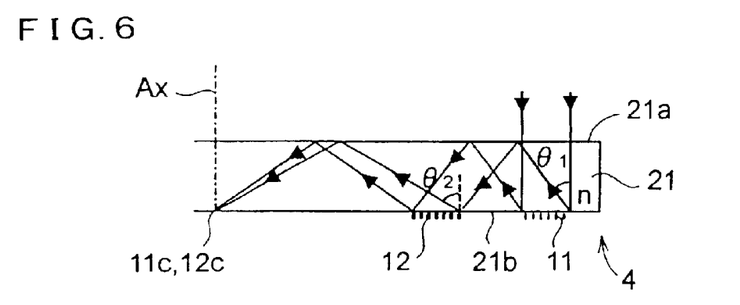
FIG. 6 is a vertical sectional view schematically showing the structure of the optical device of a fourth embodiment of the invention.

FIG. 6 schematically shows a section of the optical device 4 of a fourth embodiment of the invention. This optical device 4 is a modified version of the optical device 2 of the second embodiment, in which the diffraction gratings 11 and 12 are formed in different areas on the same surface 21b of the base plate 21. The centers 11c and 12c of the diffraction gratings 11 and 12 coincide. Light enters the optical device 4 through the surface 21a, is then reflected from the diffraction grating 11, then from the surface 21a, then from the diffraction grating 12, then from the surface 21a, and then exits the optical device 4 through the surface 21b. Meanwhile, the light is diffracted by the diffraction gratings 11 and 12 and is thereby formed into a convergent light beam that converges at the intersection between the optical axis Ax and the surface 21b. Here, how the light is made to converge to increasingly high degrees stepwise and the design of the diffraction gratings 11 and 12 are the same as in the optical device 2, and how the optical device 4 changes the NA is the same as shown in FIG. 4.

Table 4 shows a practical example of the design of the optical device 4. Here, the optical path difference function φ(r) is the same as in Table 1.

TABLE 4

Material of Base Plate 21: Quartz
Refractive Index n of Base Plate 21: 1.46959 (λ = 405 nm)
Thickness of Base Plate 21: 1 mm
NA: 1.0
Outer Diameter of Diffraction Grating 11: 5.162 mm
Inner Diameter of Diffraction Grating 12: 4.438 mm
Coefficients of Optical Path Difference Function φ(r):

|  | Diffraction Grating 11 | Diffraction Grating 12 |
|---|---|---|
| C2 | $-1.54498 \times 10^{-1}$ | $-5.21316 \times 10^{-2}$ |
| C4 | $-8.98845 \times 10^{-4}$ | $-2.20102 \times 10^{-2}$ |
| C6 | $1.02228 \times 10^{-3}$ | $2.94475 \times 10^{-3}$ |
| C8 | $-8.33410 \times 10^{-5}$ | $-2.33436 \times 10^{-4}$ |
| C10 | $2.49726 \times 10^{-6}$ | $-6.80160 \times 10^{-9}$ |
| C12 | $9.50555 \times 10^{-8}$ | $8.79946 \times 10^{-7}$ |
| C14 | 0 | 0 |

In the optical devices 2 and 3 of the second and third embodiments, the diffraction grating 11 is of a transmissive type that transmits diffracted light, and the diffraction grating 12 is of a reflective type that reflects diffracted light. In general, transmissive and reflective diffraction gratings differ in the optimum depth of their grating grooves. For example, in binary-type diffraction gratings, the optimum groove depth is $\lambda \cdot \cos(\alpha)/[2 \cdot (n-1)]$ for a transmissive type and $\lambda \cdot \cos(\alpha)/(4 \cdot n)$ for a reflective type (α represents the angle of incidence). Since diffraction efficiency lowers as the groove depth deviates from the optimum value, in the optical devices 2 and 3, the diffraction gratings 11 and 12 need to be given different groove depths. This necessitates a complicated step to form the diffraction gratings 11 and 12.

By contrast, in the optical device 4 of this embodiment, the diffraction gratings 11 and 12 are both of a reflective type, and the optimum depths of their grating grooves are the same, making it possible to form the diffraction gratings 11 and 12 in a single step. Thus, the optical device 4 has, in addition to the advantage of the optical device 3 that permits accurate alignment of the positions of the diffraction gratings 11 and 12 relative to each other, the advantage of higher fabrication efficiency.

Figure 7:
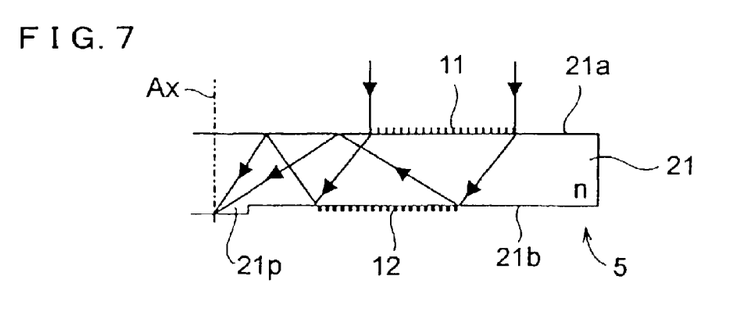
FIG. 7 is a vertical sectional view schematically showing the structure of the optical device of a fifth embodiment of the invention.

FIG. 7 schematically shows a section of the optical device 5 of a fifth embodiment of the invention. This optical device 5 is a modified version of the optical device 2 of the second embodiment, in which a portion of the surface 21b in which it crosses the optical axis Ax is made to protrude from the other portion and light is made to converge on the surface of this protruding portion 21p. A device that produces a convergent light beam with a great NA is used in the immediate vicinity of a target, and therefore it may make contact with the target if inclined even slightly. By forming a protruding portion where light exits the device in this way, it is possible to greatly reduce the risk of such contact due to inclination. It is to be understood that such a protruding portion may be formed not only in the second embodiment but also in the first, third, and fourth embodiments; that is, the optical devices 1, 3, and 4 may be modified in similar manners to achieve the same effect.

The protruding portion 21p can be formed by cutting or otherwise removing the portion around it. In a case where the diffraction grating 12 is formed on the surface 21b as in the optical devices 2 and 4 of the second and fourth embodiments, the protruding portion 21p can be formed in the same step. It is advisable to make the protruding portion 21p protrude by such a length as to prevent contact with a target effectively and permit easy fabrication, preferably in the range from 10 nm to 500 μm.

Figure 8:
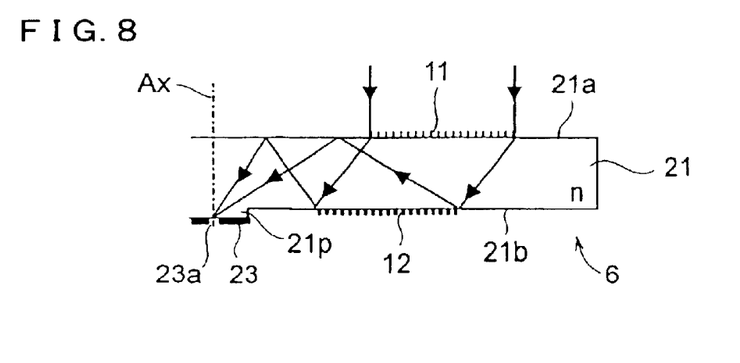
FIG. 8 is a vertical sectional view schematically showing the structure of the optical device of a sixth embodiment of the invention.

FIG. 8 schematically shows a section of the optical device 6 of a sixth embodiment of the invention. This optical device 6 is a modified version of the optical device 5 of the fifth embodiment, in which a light-shielding film 23 having a minute opening 23a is laid on the surface of the protruding portion 21p. The opening 23a is located on the optical axis Ax on which light is made to converge, and has a diameter smaller than the convergent light beam. In this way, by laying a light-shielding film 23 having a minute opening 23a on the surface through which light exits the device, it is possible to produce a convergent light beam having an even smaller diameter.

The optical device 6 can be fabricated in the same manner as the optical device 5, except that the material of the light-shielding film 23, specifically a metal such as chromium, is vapor-deposited on the surface 21b beforehand. The opening 23a is formed, for example, by photolithography. The opening 23a has a diameter of, preferably, 500 nm or less.

Figures 9, 10:
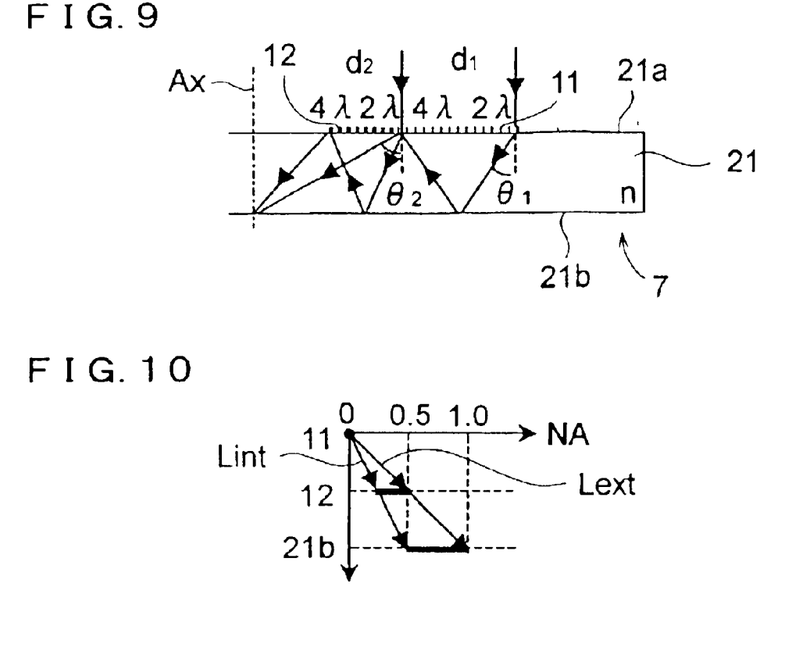
FIG. 9 is a vertical sectional view schematically showing the structure of the optical device of a seventh embodiment of the invention.
FIG. 10 is a diagram schematically showing an example of how the optical device of the seventh embodiment changes the NA of light.

FIG. 9 schematically shows a section of the optical device 7 of a seventh embodiment of the invention. This optical device 7 is a modified version of the optical device 3 of the third embodiment, which produces a convergent light beam with the same NA as the optical device 3 but by the use of differently designed diffraction gratings 11 and 12. As described earlier, there exist an infinite number of combinations of the pitches p1 and p2 of the diffraction gratings 11 and 12 that yield a convergent light beam with the desired NA. This embodiment prevents another such example.

The diffraction gratings 11 and 12 are formed on the surface 21a so as to be contiguous with each other. The pitch d1 of the diffraction grating 11 is so set as to increase away from the center 11c, with the pitch d1ext in a portion thereof where the outermost ray passes equal to twice the wavelength λ and the pitch d1int at the inner edge thereof, i.e., a portion thereof where the innermost ray passes, equal to four times the wavelength λ. The pitch d2 of the diffraction grating 12 is set in a similar manner, with the pitch d2ext at the outer edge thereof, i.e., a portion thereof where the outermost ray is reflected, equal to twice the wavelength λ and the pitch d2int in a portion thereof where the innermost ray is reflected equal to fourth times the wavelength λ.

FIG. 10 schematically shows how the optical device 7 changes the NA. As will be clear from a comparison with FIG. 4, which shows how the optical device 3 changes the NA, the two optical devices eventually produce a convergent light beam with the same NA, although by changing the NA through different processes.

Figure 11:
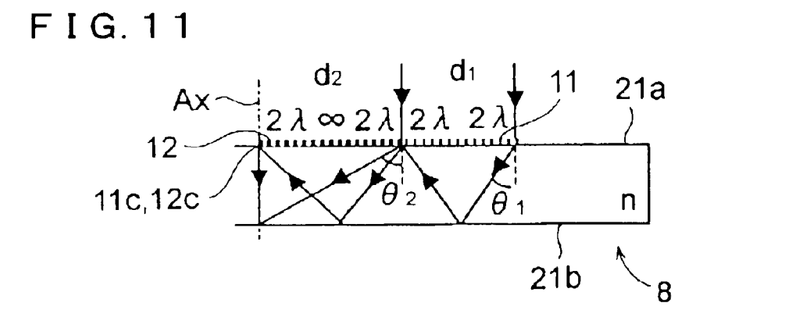
FIG. 11 is a vertical sectional view schematically showing the structure of the optical device of an eighth embodiment of the invention.

FIG. 11 schematically shows a section of the optical device 8 of an eighth embodiment of the invention. This optical device 8, too, is a modified version of the optical device 3 of the third embodiment, which uses differently designed diffraction gratings 11 and 12. This optical device 8, however, produces a convergent light beam with the same NA as the optical device 1 of the first embodiment.

The diffraction gratings 11 and 12 are formed on the surface 21a so as to be contiguous with each other. The diffraction grating 12 is not ring-shaped but circular. The pitch d1 of the diffraction grating 11 equals twice the wavelength λ. The diffraction grating 12 is so designed as to cause diffraction of opposite signs between one and the other side of the circle at half its radius. Specifically, the pitch on the circle at half the radius of the diffraction grating 12 is infinite, the pitch d2ext at the outer edge thereof, i.e., a portion thereof where the outermost ray is reflected, is twice the wavelength λ, and the pitch dax on the optical axis Ax (at the center 12c) where the innermost ray is reflected is also twice the wavelength λ.

Figure 12:
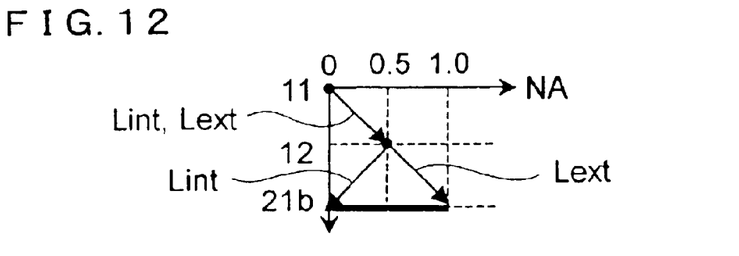
FIG. 12 is a diagram schematically showing an example of how the optical device of the eighth embodiment changes the NA of light.

FIG. 12 schematically shows how the optical device 8 changes the NA. As will be clear from a comparison with FIG. 2, which shows how the optical device 1 changes the NA, the two optical devices eventually produce a convergent light beam with the same NA, although by changing the NA through different processes. The second to seventh embodiments all deal with cases in which a convergent light beam is produced by removing a small conical portion with a small NA from a conical convergent light beam with a great NA. However, with similar structures, depending on how the diffraction gratings 11 and 12 are designed, it is also possible to produce a convergent light beam from which the portion with a small NA is not removed, as with the optical device 8 of this embodiment.

Figure 13:
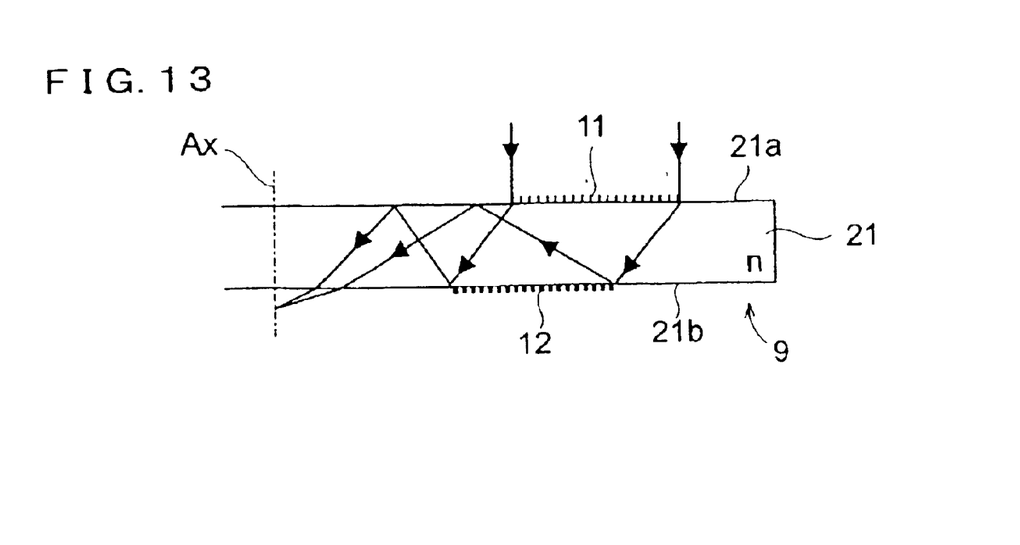
FIG. 13 is a vertical sectional view schematically showing the structure of the optical device of a ninth embodiment of the invention.

FIG. 13 schematically shows a section of the optical device 9 of a ninth embodiment of the invention. This optical device 9 is a modified version of the optical device 2 of the second embodiment, in which light is made to converge at a point outside the surface 21b in the vicinity thereof That is, the optical device 9 is not a solid immersion device. Even then, light is diffracted to increasingly high degrees stepwise by the diffraction gratings 11 and 12, making it possible to produce a convergent light beam with an NA of from 0.5 to 1.0 in the range of distances of from 1 μm to 1 mm between the surface 21b and the point at which the light converges. Thus, it is possible to illuminate an extremely small area on a target while securing a sufficient distance to the target. It is to be understood that light may be made to converge at a point outside the surface 21b not only in the second embodiment but also in the first and third to eighth embodiments; that is, the optical devices 1 and 3 to 8 may be modified in similar manners to achieve the same effect.

The optical devices of the embodiments described above not only produce a convergent light beam with a great NA but also are shaped like flat plates and thus are easy to handle, permitting easy alignment of optical axes with another optical device. Thus, these optical devices are suitable for use in optical systems of microscopes and optical recording apparatus. It is to be understood that the specific structures and designs described in the embodiments are given merely for the purpose of presenting examples of the present invention. For example, it is also possible to combine the structures of the optical devices 2 and 3 of the second and third embodiments to produce an optical device provided with three diffraction gratings so as to obtain a convergent light beam with an NA greater than 1. The embodiments deal only with cases in which light is diffracted by diffraction gratings. It is also possible, however, to achieve diffraction by the use of holograms.

Obviously, many modifications and variations of the present invention are possible in light of the above teachings. It is therefore to be understood that within the scope of the appended claims, the invention may be practiced other than as specifically described.

What is claimed is:

1. An optical device for making light shone into the optical device converge, comprising:

a plurality of diffracting portions each making light passing therethrough converge by diffraction, wherein optical axes of the plurality of diffracting portions coincide with one another, the light shone into the optical device is passed through one after another of the plurality of diffracting portions so that the light is made to converge to a higher degree every time the light passes through one of the diffracting portions, and at least one of the diffracting portions makes light converge by reflecting the light.

2. The optical device as claimed in claim 1, wherein at least one of the diffracting portions makes light converge by transmitting the light.

3. The optical device as claimed in claim 2, wherein the plurality of diffracting portions are formed on a flat plate that includes a first surface on which the light is incident and a second surface located opposite to the first surface, a first diffracting portion being formed on the first surface and a second diffracting portion being formed on the second surface, the incident light being, in order, first transmitted through the first diffracting portion, then reflected from the second diffracting portion, and then reflected from the first surface so as to converge town the second surface.

4. The optical device as claimed in claim 2, wherein the plurality of diffracting portions are formed on a flat plate that includes a first surface on which the light is incident and a second surface located opposite to the first surface, first and second diffracting portions being formed on the first surface, the incident light being, in order, first transmitted through the first diffracting portion, then reflected from the second surface, and then reflected from the second diffracting portion so as to converge toward the second surface.

5. The optical device as claimed in claim 1, wherein at least one of the diffracting portions is formed on a surface of the optical device.

6. The optical device as claimed in claim 1, wherein at least one of the diffracting portions is formed inside the optical device.

7. The optical device as claimed in claim 1, wherein at least two of the diffracting portions are formed in different areas on a same surface.

8. The optical device as claimed in claim 1, wherein at least one of the diffracting portions is a diffraction grating.

9. The optical device as claimed in claim 1, wherein the light shone into the optical device is made to converge in such a way that the light has a minimum diameter on surface through which the light exits the optical device.

10. The optical device as claimed in claim 1, further comprising:

a light-shielding member provided on a surface through which the light shone into the optical device exits the optical device, the light-shielding member having an opening smaller than a diameter of the light on the surface, wherein the light is made to exit the optical device through the opening.

11. The optical device as claimed in claim 1, wherein part of a surface of the optical device is formed into a protruding portion, and the light shone into the optical device is made to exit the optical device through the protruding portion.

12. The optical device as claimed in claim 1, wherein the plurality of diffracting portions are formed on a flat plate that includes a first surface on which the light is incident and a second surface located opposite to the first surface, first and second diffracting portions being formed on the second surface, the incident light being, in order, first transmitted through the first surface, then reflected from the first diffracting portion, then reflected from the first surface, then reflected from the second diffracting portion, and then reflected from the first surface, so as to converge toward the second surface.

13. A solid immersion device for use in an optical recording head that performs at least one of recording, reproducing, and erasing of information by use of light, comprising:

a plurality of diffracting portions each making light passing therethrough converge by diffraction, wherein light shone into the solid immersion device is passed through one after another of the plurality of diffracting portions so that the light is made to converge to a higher degree every time the light passes through one of the diffracting portions, and at least one of the diffracting portions makes light converge by reflecting the light.

14. The solid immersion device as claimed in claim 13, wherein at least one of the diffracting portions makes light converge by transmitting the light.

15. The solid immersion device as claimed in claim 13, wherein at least one of the diffracting portions is formed on a surface of the solid immersion device.

16. The solid immersion device as claimed in claim 13, wherein at least one of the diffracting portions is formed inside the solid immersion device.

17. The solid immersion device as claimed in claim 13, wherein the light shone into the solid immersion device is made to converge in such a way that the light has a minimum diameter on a surface through which the light exits the solid immersion device.

18. The solid immersion device as claimed in claim 13, further comprising:

a light-shielding member provided on a surface through which the light shone into the solid immersion device exits the solid immersion device, the light-shielding member having an opening smaller than a diameter o the light on the surface, wherein the light is made to exit the solid immersion device through the opening.

19. The solid immersion device as claimed in claim 13, wherein part of a surface of the solid immersion device is formed into a protruding portion, and the light shone into the solid immersion device is made to exit the solid immersion device through the protruding portion.

20. A solid immersion device for use in an optical recording head that performs at least one of recording, reproducing, and erasing of information by use of light, comprising:

a plurality of diffracting portions each making light passing therethrough converge by diffraction, wherein light shone into the solid immersion device is passed through one after another of the plurality of diffracting portions so that the light is made to converge to a higher degree every time the light passes through one the diffracting portions, and at least two of the diffracting portions are formed in different areas on a same surface.

21. The solid immersion device as claimed in claim 13, wherein at least one of the diffracting portions is a diffraction grating.

* * * * *